United States Patent [19]

Falempin et al.

[11] Patent Number: 5,005,782
[45] Date of Patent: Apr. 9, 1991

[54] TWO DIMENSIONAL AND ASYMMETRIC SUPERSONIC AIR INTAKE FOR THE COMBUSTION AIR OF AN AIRCRAFT ENGINE

[75] Inventors: Francois Falempin, Saint Michel Sur Orge; Claude Sans, Massy; Champigny Patrick, Villebon Sur Yvette; Gérard Laruelle, Le Plessis Robinson; Jean-Marie Garrel, Tremblay-Les-Gonnesses, all of France

[73] Assignee: Office National d'Etudes et de Recherches Aerospatiales (ONERA), France

[21] Appl. No.: 386,130

[22] Filed: Jul. 28, 1989

[30] Foreign Application Priority Data

Aug. 7, 1988 [FR] France ............... 88-10557

[51] Int. Cl.$^5$ ............... B64D 33/02
[52] U.S. Cl. ............... 244/53 B; 137/15.1
[58] Field of Search ............... 244/53 B; 137/15.1, 137/15.2

[56] References Cited

U.S. PATENT DOCUMENTS

| 2,932,945 | 4/1960 | Brandt, Jr. ............... 244/53 B X |
| 3,062,484 | 11/1962 | Himka ............... 244/53 B |
| 3,104,522 | 9/1963 | Pennington et al. ............... 244/53 B |
| 3,126,174 | 3/1964 | Zetterström et al. ............... 244/53 B |
| 3,161,379 | 12/1964 | Lane ............... 244/53 B |
| 3,265,331 | 8/1966 | Miles ............... 244/53 B |
| 3,302,657 | 2/1967 | Bullock ............... 244/53 B X |
| 3,333,794 | 8/1967 | Lewis ............... 244/53 B |
| 3,540,221 | 11/1970 | Bouiller et al. ............... 137/15.1 X |
| 3,799,475 | 3/1974 | Mitchell et al. ............... 244/53 B |
| 4,007,891 | 2/1977 | Sorensen et al. ............... 244/53 B |

FOREIGN PATENT DOCUMENTS 1552118 1/1969 France ............... 244/53 B

Primary Examiner—Margaret A. Focarino
Assistant Examiner—James M. Kannofsky
Attorney, Agent, or Firm—Larson and Taylor

[57] ABSTRACT

A two dimensional supersonic air intake is provided for the combustion air of an aircraft engine comprising on one side a front flap (3) forming a visor and on the other side a fairing (4). The front flap (3) is movable about a pivoting axis (5) situated opposite the fairing (4). The front flap (3) is fast with a mobile fairing nose (6) situated in front of fairing (4) and moving in front of the latter when the front flap (3) moves in the direction which increases the air intake section.

6 Claims, 5 Drawing Sheets

TWO DIMENSIONAL AND ASYMMETRIC SUPERSONIC AIR INTAKE FOR THE COMBUSTION AIR OF AN AIRCRAFT ENGINE

The invention relates to a supersonic air intake for the combustion air of an aircraft engine, this air intake being of the two dimensional and asymmetric type, i.e. the asymmetric character of this air intake results from the fact that it has on one side a front flap forming a visor and on the other side a fairing.

An air intake must be able to perform well (in efficiency and flowrate) throughout a wide flight range so as to be able to be applied to numerous aircraft: thus, the air intake must have an intake section which may increase in appreciable proportions with the increase of the Mach number.

In fact, when the Mach number inceases, the efficiency of the air intake (ratio between the generating pressure at the intake of the engine and the infinite pressure upstream) means that it is more and more necessary to divert the flow arriving in the air intake, for slowing it down as much as possible by a succession of oblique shock waves so that the Mach number upstream of the final straight shock wave is the lowest possible, generally round about a value of 1.4.

Furthermore, whatever the aerobe engine used, the more the upstream Mach number increases, the greater must be the collected flow section. In particular, for aircraft flying up to Mach numbers higher than Mach 3, it is advantageous to have larger air intake sections. Thus, variable geometry air intakes have been proposed.

The prior art related to variable geometry air intakes, which concerns aircraft flying relatively slowly (M < 2.5), corresponds to the constructions provided on the aircraft CONCORDE (mobile compression and diffusion ramps defining therebetween an internal boundary layer trap), on the aircraft (AVIONS MARCEL DASSAULT/BREGUET AVIATION "MIRAGE" (mobile body, called "mouse" (shock cone)—along the wall of the fairing), on the aircraft McDONNELL DOUGLAS F15 (front element comprising a flap fast with sidewalls forming an assembly pivoting about an axis in the vicinity of the leading edge of the fairing).

The patent France No. 1 234 483 describes an air intake which is adapted solely for high speeds, particularly supersonic speeds, and it has as object devices capable of improving the operation of this air intake at slow speeds, particularly for subsonic speeds. For this, the air intake according to this patent comprises two separate elements each having a pivoting axis and which are connected mechanically together by a lever system.

The object of the present invention consists of a variable geometry air intake able to have a collecting section which may increase greatly with the Mach number while answering better the different requirements of practice than the air intakes of the prior art which have, particularly, the following drawbacks:

the CONCORDE type air intake: small intake section variation, limited to the favourable effect of flight incidence, AVIONS MARCEL DASSAULT.BREGUET AVIATION "MIRAGE" type air intake: zero intake section variation;

MCDONNELL DOUGLAS F15 type air intake: variation of the section relatively large, but considerable shocks on the internal wall of the fairing coming from the separation of the flow which greatly reduces the efficiency of the air intake, air intake of the type described in the patent France No. 1 234 483: considerable reduction of the flow coefficient at subsonic speeds, which leads to a deterioration of the propulsive balance because of the increase of drag caused by the flap.

The two dimensional supersonic air intake for the combustion air of an aircraft engine comprises:

on one side, a fairing, on the other side, a front flap forming a visor and articulated about a pivoting axis situated opposite the fairing, and a mobile fairing nose situated in front of the fairing and fast with said front flap.

According to the invention, this mobile fairing nose is adapted so as to move in front of the fairing when the front flap moves in the direction which increases the air intake section.

The forward movement of the mobile fairing nose limits the deflection of the internal flow at the level of the fairing. In addition, the minimum air intake section is substantially constant and the downstream portion of the air intake which forms a diffuser for bringing the combustion air to the engine may have a fixed geometry.

Under these conditions, for a given upstream Mach number and incidence angle for the air intake, it is possible to cause the front flap-mobile fairing nose assembly to pivot so as to obtain a practically constant Mach number at the level of the fairing nose, so to obtain a Mach number well matched to the corresponding geometry of the air intake.

Thus, optimum matching of the air intake is obtained as a function of the joint development of the supersonic Mach number and of the air intake incidence during flight.

In a first advantageous arrangement of the invention, the pivoting axis of the front flap is situated in the vicinity of a boundary layer trap disposed in the wall of the air intake which extends said front flap.

In so far as the mobile fairing nose fast with the front flap is concerned, recourse may be had to one or other of the following two embodiments and in which:

in the first of these embodiments, the mobile fairing nose moves in front of the fairing in the extension thereof because of facing cylindrical surfaces centered on the pivoting axis of the front flap, and for the second of these embodiments, the mobile fairing nose moves in front of the fairing while defining therewith a variable section passage forming a boundary layer trap through facing surfaces which move away from each other when the front flap moves in the direction which inceases the air intake section.

In a variant of the first embodiment, the movement of the facing cylindrical surfaces uncovers openings formed in their walls so as to create a particular law of variation of the section of the boundary layer trap as a function of the movement of the front flap.

Constructively, the mobile fairing nose is secured to the front flap by lateral sides, the assembly forming a rigid pivoting case. This constructive solution solves the problems of sealing, eliminates the mechanical vibrations and does away with the need for a connecting mechanism of the lever kind.

The invention consists, apart from the arrangements which have just been discussed, of certain other arrangements which are preferably used at the same time and which will be more explicitly discussed hereafter.

The invention will in any case be well understood from the complement of description which follows, as well as from the accompanying drawings, which complement and drawings are relative to preferred embodiments of the invention and of course comprise no limitative character.

FIGS. 1 and 2 of these drawings are two schematic front views of an aircraft equipped with air intakes in accordance with the invention;

Figure 1:
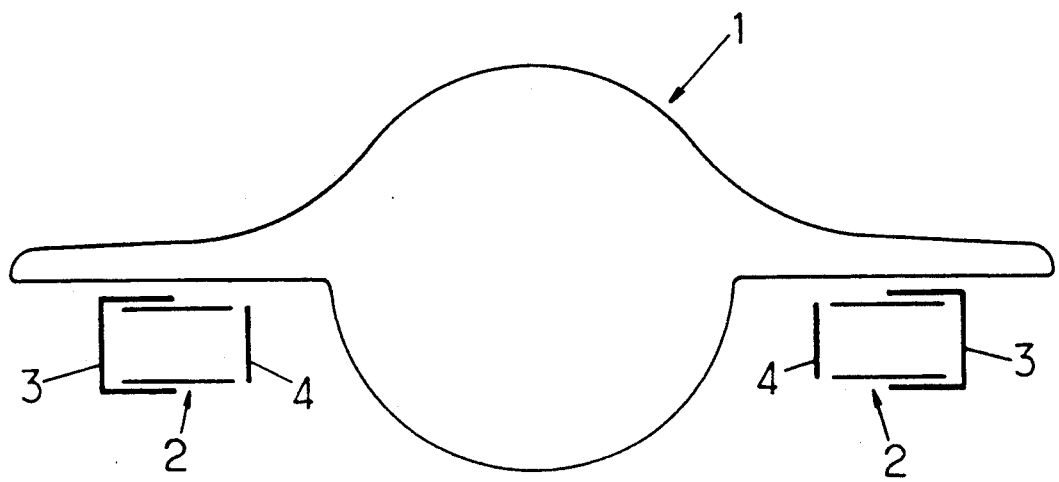
Figure 2:
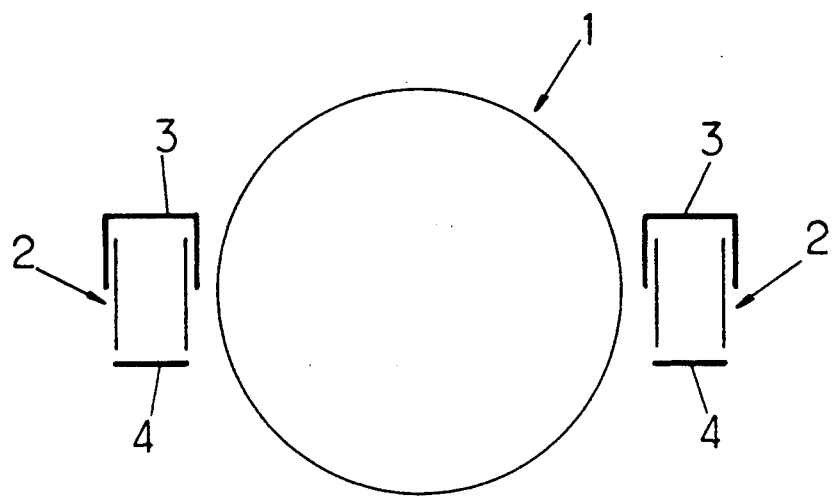

In FIGS. 1 and 2, the silhouette of an aircraft has been shown at 1, seen from the front and comprising two air intakes 2 situated under the wings (FIG. 1) or laterally on each side of the fuselage (FIG. 2).

Each air intake 2 supplies an engine (not shown) of aircraft 1 with combustion air.

As shown in FIGS. 3 to 7 which are longitudinal sections of an air intake in accordance with the invention, the air intake, of two dimensional type and asymmetric, comprises on one side a front flap 3 forming a visor and on the other side a fairing 4.

The flap 3 is movable about a pivoting axis 5 situated opposite the fairing 4.

The front flap 3 is fast with a mobile fairing nose 6 situated in front of fairing 4 and moving in front of the latter when the front flap 3 moves in the direction which increases the air collecting section.

In these Figures, the front flap 3 is firmly secured to the fairing nose 6 by lateral sides 23, the whole forming a rigid pivoting case.

It is advantageous, as shown in FIGS. 3 to 7, to have an arrangement of the pivoting axis 5 of the front flap 3 such that said pivoting axis 5 is situated in the vicinity (preferably in front) of a boundary layer trap 7 disposed in the air intake wall which extends the front flap 3.

The air collected by the front flap 3 therefore meets the compression ramp 8 formed by the internal wall of the front flap 3, the boundary layer trap 7, the diffuser 9 formed by the internal wall of the air intake which extends the compression ramp 8.

Figure 3:
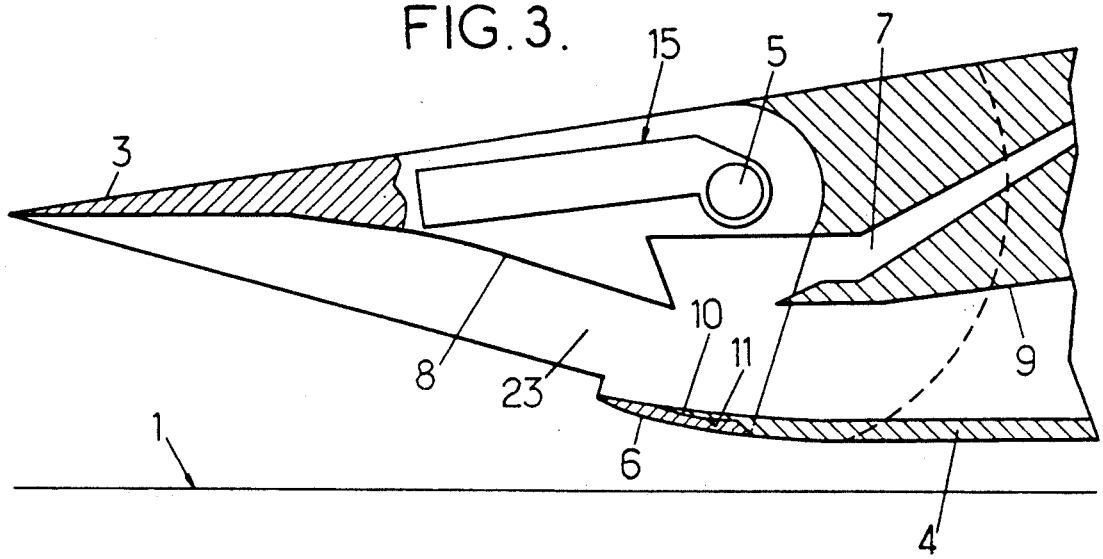
FIGS. 3 and 4 show, in two different positions, an air intake constructed in accordance with the first embodiment of the invention.
Figure 4:
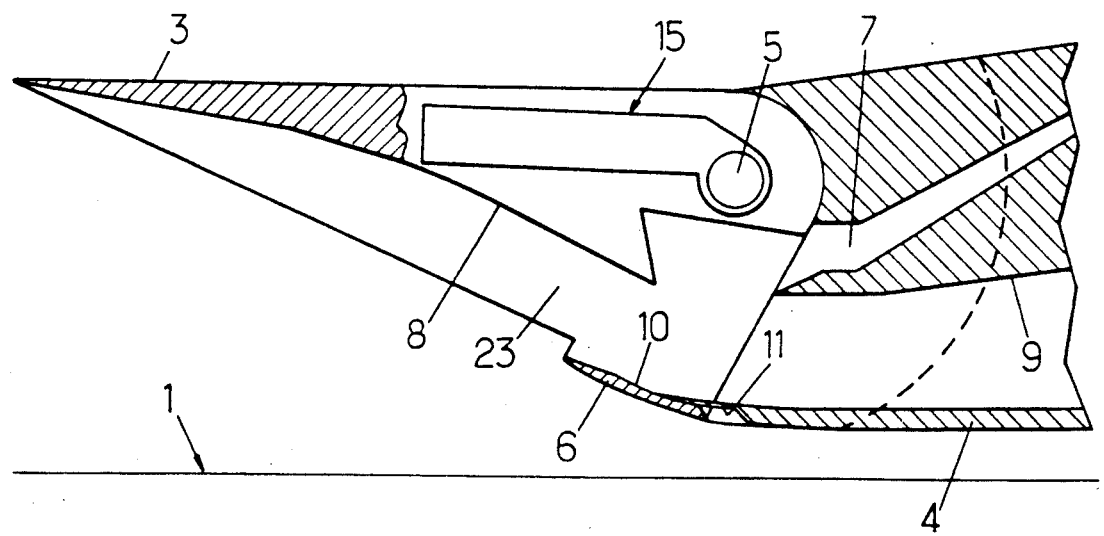
Figure 7:
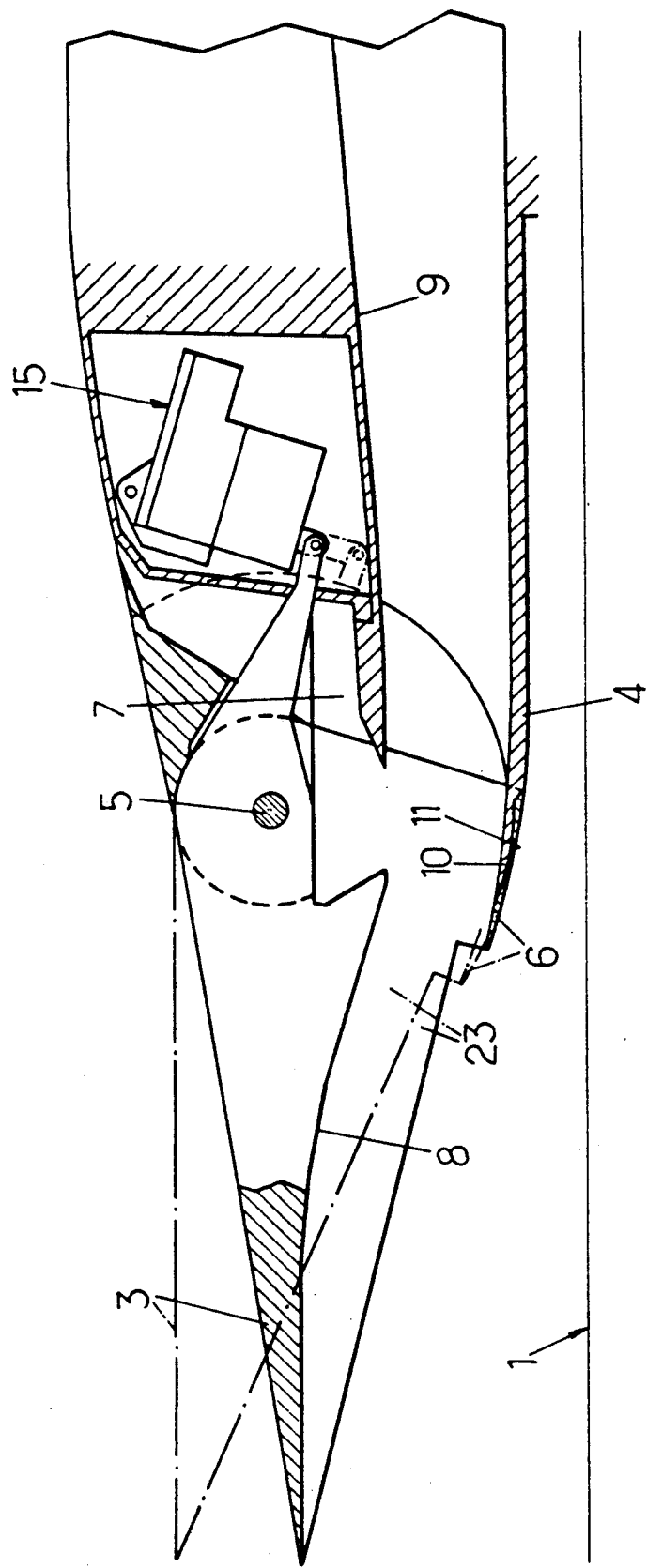
FIG. 7 shows a variant of the first embodiment illustrated in FIGS. 3 and 4.

In the embodiment illustrated in FIGS. 3, 4 and 7, the mobile fairing nose 6 moves in front of fairing 4 while defining therewith a variable section passage 12 forming a boundary layer trap through facing surfaces 13 and 14 which move away from each other when the front flap 3 moves in the direction which increases the air intake section.

Figure 5:
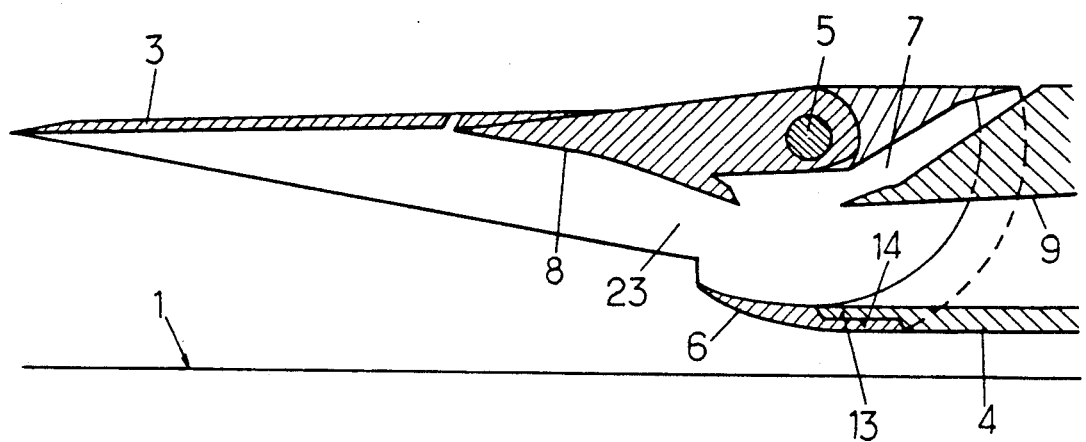
FIGS. 5 and 6 show, in two different positions, an air intake formed in accordance with a second embodiment of the invention.
Figure 6:
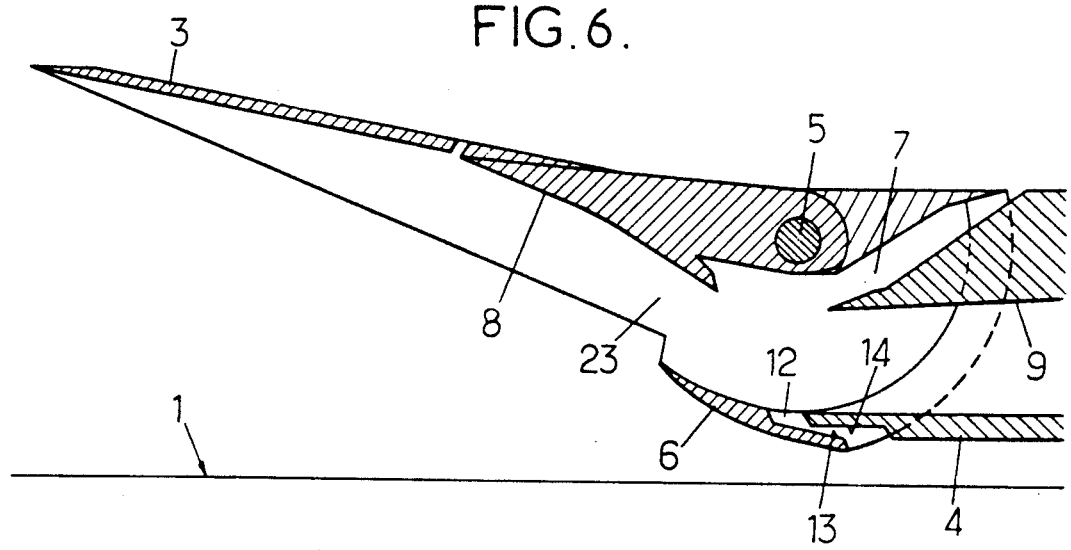

The operation of an air intake formed in accordance with the invention is then the following:

at a low Mach number (e.g. less than 2.5), the front flap 3 and the mobile fairing nose 6 are in the position shown in FIGS. 3 and 5 and on the continuous line in FIG. 7. In FIG. 5, passage 12 has a zero section;

at a high Mach number (e.g. higher than 3), the front flap 3 and the mobile fairing nose 6 are in the position shown in FIGS. 4 and 6 and on the continuous line in FIG. 7. In FIG. 6, passage 12 has a maximum section and therefore forms a boundary layer trap.

In so far as the drive means to be used for actuating the front flap 3—mobile fairing nose 6 assembly are concerned, they are designated generally by the reference 15 in FIGS. 3, 4 and 7.

Considering the severe conditions of use, drive means 15 of the irreversible type should be provided, i.e. so that in the absence of an energy source, the front flap 3—mobile fairing nose 6 assembly is immobilized in the waiting position at the time of a cut in the energy supply.

Moreover, these drive means 15 may have a minimum size so as to be housed preferably in the front flap 3 (FIGS. 3 and 4) or in a housing situated at the rear of the boundary layer trap 7 (FIG. 7).

Finally, these drive means 15 may have the smallest possible response time so as to be able to cause rapid manoeuvring of the front flap 3—mobile fairing nose 6 assembly.

In FIGS. 3, 4 and 7, these drive means 15 have been shown schematically.

Figure 8:
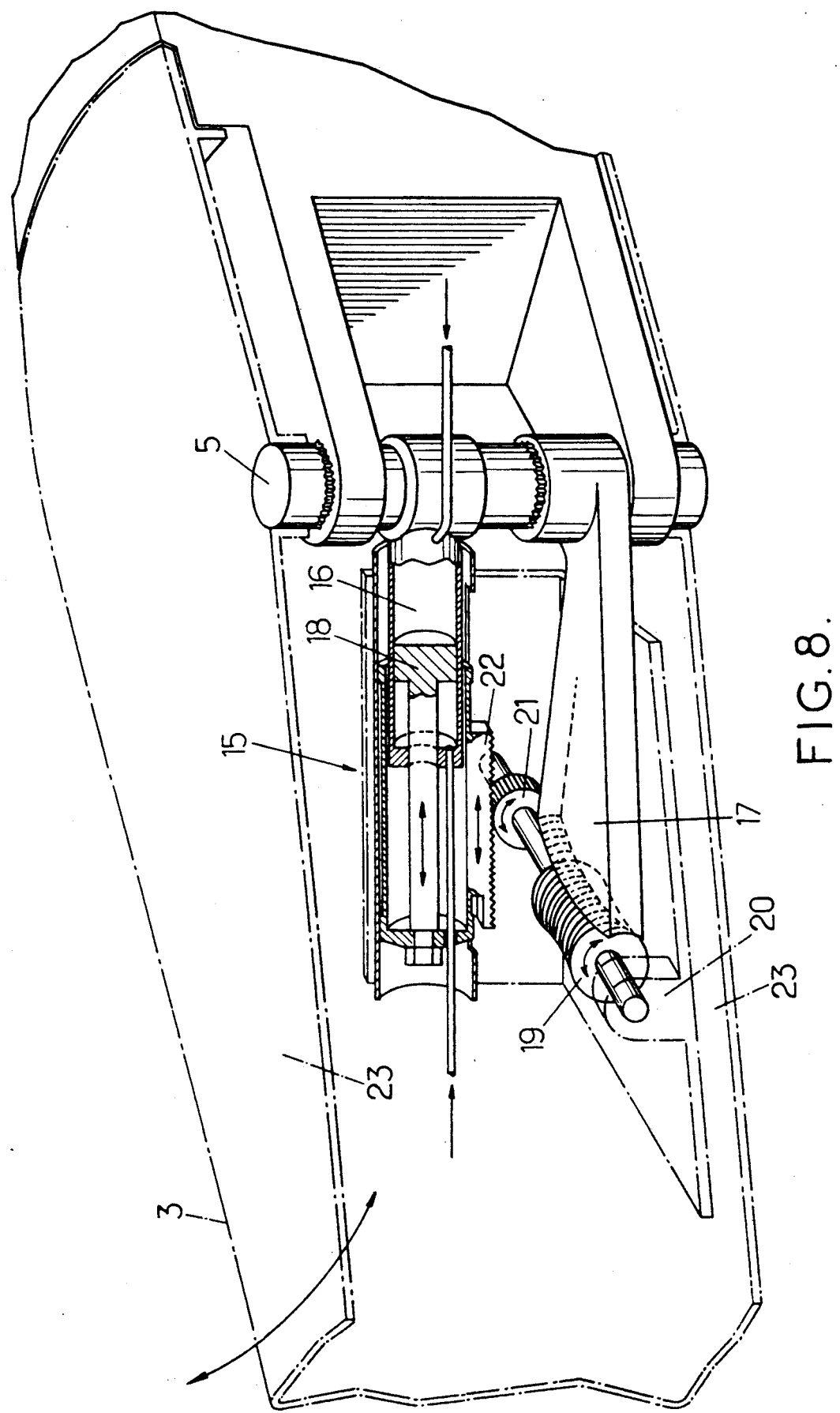
FIG. 8 is a schematic perspective view of an advantageous constructive arrangement of the invention.

In FIG. 8, these drive means 15 have been shown in detail and are formed essentially by:

an actuator body 15 mounted for pivoting about the pivoting axis 5 of the front flap 3, a toothed sector 17 fast with the pivoting axis 5 of the front flap 3, an actuator piston 18 sliding in the actuator body 16 under the action of a pneumatic pressure, an houg-glass screw 19 engaged with the toothed sector 17, fixed on a shaft rotating in bearings 20 fast with the front flap 3, a rack 22 and pinion 21 connection between the hour-glass screw 19 and the actuator piston 18.

The pressurized air, controlled by electrovalves (not shown), arrives in the actuator body 16 and the actuator piston 19 drives rack 22 in one direction or the other which rotates pinion 21 and the hour-glass screw 19, whose axial position is blocked. The hour-glass screw 19 engaged with the fixed toothed sector 17 causes the front flap 3 and the mobile fairing nose 6 to pivot about the pivoting axis 5.

Such drive means 15 are simple to produce, of irreversible type, because of the hour-glass screw-toothed sector reaction, compact, able to be made from materials capable of withstanding a high operating temperature.

What is claimed is:

1. A two-dimensional supersonic air intake for the harness of the combustion air at the exterior of a supersonic aircraft provided with at least a jet engine, said air intake being arranged for supplying said aircraft jet engine with said combustion air, said air intake having two opposite sides, said air intake comprising:

on one side a fairing, on the other side, a front flap forming a visor and articulated about a pivot axis situated opposite said fairing, a mobile fairing nose situated in front of said fairing and fast with said front flap, said mobile fairing nose being adapted for moving in front of said fairing when said front flap moves in the direction which increases the air intake section, said mobile fairing nose being arranged so that when moving in front of said fairing it defines therewith a variable section passage forming a boundary layer trap through facing surfaces which move away from each other when said front flap moves in the direction which increases the air intake section.

2. A two-dimensional supersonic air intake according to claim 1, wherein said mobile fairing nose is made fast with said front flap by lateral sides, the assembly forming a rigid pivoting case.

3. A two-dimensional supersonic air intake according to claim 1, wherein said front flap and said mobile fairing nose are actuated by drive means of irreversible type.

4. A two-dimensional supersonic air intake for the harness of the combustion air at the exterior of a supersonic aircraft provided with at least a jet engine, said air intake being arranged for supplying said aircraft jet engine with said combustion air, said air intake having two opposite sides, said air intake comprising:

on one side a fairing, on the other side, a front flap forming a visor and articulated about a pivot axis situated opposite said fairing, a mobile fairing nose situated in front of said fairing and fast with said front flap, said mobile fairing nose being adapted for moving in front of said fairing when said front flap moves in the direction which increases the air intake section, said mobile fairing nose moving in front of said fairing in an extension thereof through facing cylindrical surfaces centered on said pivoting axis, said cylindrical surfaces being provided with openings forming a boundary layer trap, the formation of the openings defined so as to obtain a particular law of variation of the section of the boundary layer trap as a function of the movement of said front flap.

5. A two-dimensional supersonic air intake according to claim 4, wherein said mobile fairing nose is made fast with said front flap by lateral sides, the assembly forming a rigid pivoting case.

6. A two-dimensional supersonic air intake according to claim 4, wherein said front flap and said mobile fairing nose are actuated by drive means of irreversible type.

* * * * *